(12) United States Patent
Pauliks et al.

(10) Patent No.: US 6,981,003 B2
(45) Date of Patent: Dec. 27, 2005

(54) METHOD AND SYSTEM FOR MASTER PLANNING PRIORITY ASSIGNMENT

(75) Inventors: Michael Georg Pauliks, Fishkill, NY (US); Michael Lee Bundy, Hernando Beach, FL (US); Thomas Robert Ervolina, Hopewell Junction, NY (US); Darrell Lavern Harrod, Wake Forest, NC (US); James Kanuch, Powell, OH (US); Amanda Kotecki, Hillsborough, NC (US); Grant Lindsey MacKay, NW Concord, NC (US); Sarah Elizabeth Santo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 09/922,058

(22) Filed: Aug. 3, 2001

(65) Prior Publication Data

US 2003/0028507 A1    Feb. 6, 2003

(51) Int. Cl.[7] .............................................. G06F 17/30
(52) U.S. Cl. ............................... 707/200; 707/3; 707/6; 707/10
(58) Field of Search ............................... 707/1, 3, 10, 6, 707/200; 705/14, 27, 5, 26, 1, 10; 706/47

(56) References Cited

U.S. PATENT DOCUMENTS

| | | | |
|---|---|---|---|
| 4,866,628 A | 9/1989 | Natarajan | 364/468 |
| 5,168,445 A | 12/1992 | Kawashima et al. | 364/403 |
| 5,191,638 A | 3/1993 | Wakami et al. | 395/51 |
| 5,265,006 A | 11/1993 | Asthana et al. | 364/401 |
| 5,315,508 A | 5/1994 | Bain et al. | 364/401 |
| 5,432,887 A | 7/1995 | Khaw | 395/11 |
| 5,446,890 A | 8/1995 | Renslo et al. | 395/600 |
| 6,047,290 A | 4/2000 | Kennedy et al. | |
| 6,088,727 A | 7/2000 | Hosokawa et al. | 709/223 |
| 6,167,380 A | 12/2000 | Kennedy et al. | 705/10 |
| 6,188,989 B1 | 2/2001 | Kennedy | 705/8 |
| 6,377,944 B1 * | 4/2002 | Busey et al. | 707/3 |
| 6,377,956 B1 * | 4/2002 | Hsu et al. | 707/104.1 |
| 2002/0188499 A1 * | 12/2002 | Jenkins et al. | 705/10 |

* cited by examiner

*Primary Examiner*—Shahid Alam
*Assistant Examiner*—Cam Y Truong
(74) *Attorney, Agent, or Firm*—Derek S. Jennings; Cantor Colburn LLP

(57) ABSTRACT

A method and system for performing master planning priority assignment is presented. The method includes assigning a priority to a demand record that contains at least one demand attribute and a priority field. The assignment includes identifying a database that contains priority assignment rules for demand records and then querying the rule database to find the database record that corresponds to the particular demand record. The corresponding database record is found by matching the data in the attribute fields in the rule database and the demand record. The priority associated with the matching priority database record is assigned to the demand record. Additional embodiments include a system and storage medium for performing master planning priority assignment.

29 Claims, 5 Drawing Sheets

| | DUE DATE | CUSTOMER | FORECAST/ORDER | PRIORITY |
|---|---|---|---|---|
| EXPLICIT | + 2 weeks | customer one | forecast | 3 |
| HIERARCHY | + 2 weeks | large enterprise | forecast | 2 |
| WILDCARD | + 2 weeks | * | forecast | 4 |

FIG 1

METHOD AND SYSTEM FOR MASTER PLANNING PRIORITY ASSIGNMENT

FIELD OF THE INVENTION

The present invention relates generally to master planning priority assignment. More specifically, the present invention is directed to a method and system for use by priority assignment planners to create supply allocation rules and then to apply these rules to a given set of customer demands.

BACKGROUND OF THE INVENTION

Master planning priority assignment involves matching up the supply of a product to the demands for the product. This becomes particularly important when there is not enough supply to meet the demand. One of the tasks of a priority assignment planner is to determine which customer demands take priority and which demands have the possibility of not being met in the time frame requested. In a small organization it may be possible to perform this prioritization by reviewing each demand entry and making a determination of its priority compared to all other demands. An automated method to perform this prioritization is required once the number of demands or products becomes large. Systems currently exist which allow a priority assignment planner to automate the prioritization process and to use the computer to assign priorities to demands. In many cases it is possible to group customers or demand time frames into general categories in terms of prioritization. For example, it may be the rule in a particular organization that all demand time frames of 3 months from the start of the planning horizon get a priority of "4." This grouping of like attributes is advantageous because it saves the priority assignment planner time. However, in most cases there will also be exceptions to the general rules and the priority assignment planner must take them into account when assigning priorities to specific demands. Current master planning priority assignment systems do not offer the functionality to specify general business rules for priority assignment and then the ability to specify exceptions to the general business rules. Instead of general business rules, current master planning priority assignment systems require priorities as input.

SUMMARY OF THE INVENTION

An exemplary embodiment of the present invention is a method for performing master planning priority assignment. The method includes assigning a priority to a demand record that contains at least one demand attribute and a priority field. The assignment includes identifying a database that contains priority assignment rules for demand records and then querying the rule database to find the database record that corresponds to the particular demand record. The corresponding database record is found by matching the data in the attribute fields in the rule database and the demand record. The priority associated with the matching priority database record is assigned to the demand record. Additional embodiments include a system and storage medium for performing master planning priority assignment.

The above-discussed and other features and advantages of the present invention will be appreciated and understood by those skilled in the art from the following detailed description and drawings.

BRIEF DESCRIPTION OF THE DRAWINGS

The present invention will now be described, by way of an example, with references to the accompanying drawings, wherein like elements are numbered alike in the several FIGURES.

FIG. 1 depicts the layout of an exemplary rule database.

DETAILED DESCRIPTION OF THE INVENTION

Figure 2:
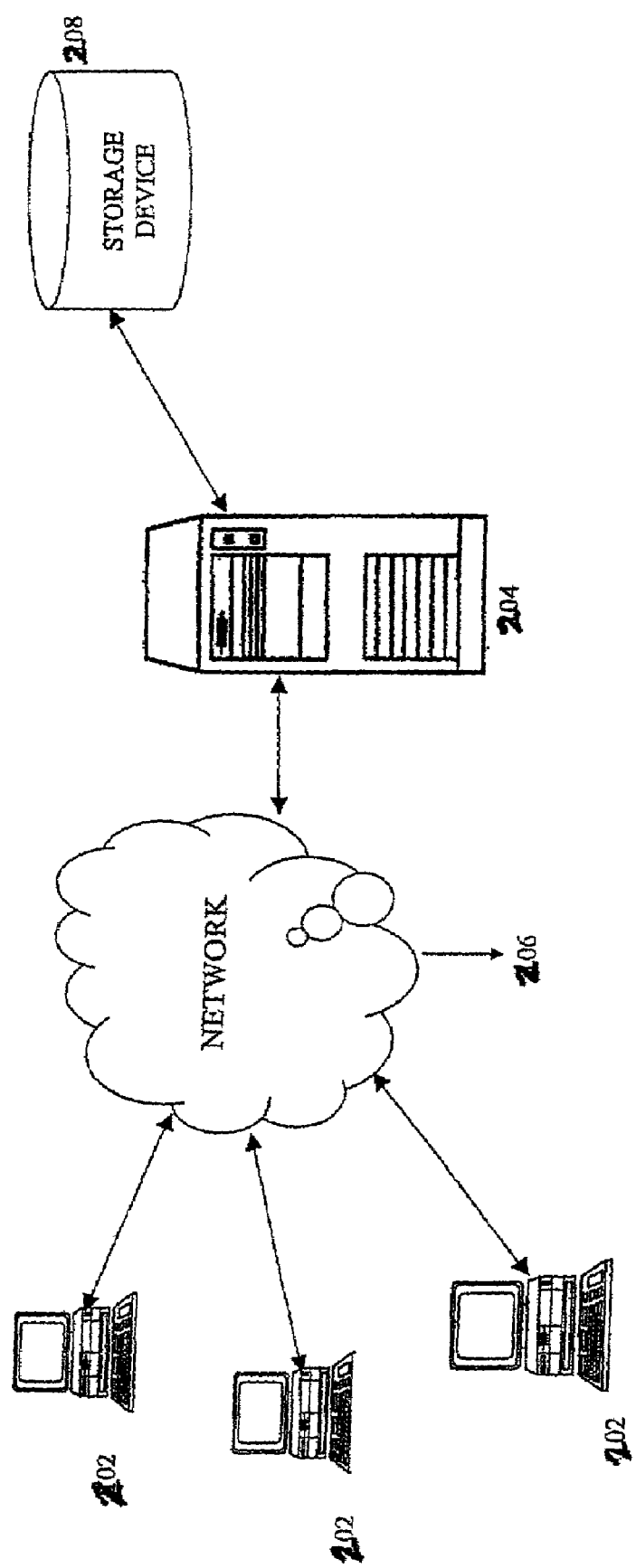
FIG. 2 is a block diagram of an exemplary system for master planning priority assignment.

The present invention facilitates the master planning priority assignment process by providing a method to describe and apply priorities to customer demands. An embodiment of the invention includes two major components: a "ruler" that defines the general rules for assigning priorities to demands; and an "assigner" that executes the actual priority assignments based on the rules defined by the ruler.

The ruler component is used to define and store the rules for assigning priorities to demands. The ruler does not perform the actual priority assignments but provides the framework which will be used in the assignments. The exemplary embodiment of the present invention allows for any attributes to be included in the rule database. The rule attributes should be selected from attributes found in the customer demand files that categorize the demands. FIG. 1 depicts an exemplary rule database layout 100 which contains the attributes: due date relative to the start date of the planning horizon 102, customer 104, and type of demand such as forecast or actual order 106. These attributes are provided as an example only and do not imply any limitation in terms of type or quantity of attributes. In addition, the database layout 100 includes a field for priority 108. It is this field that will be updated by the assigner component. An assignment rule specifies the priority for an "and" combination of these attribute values.

In an exemplary embodiment there are three types of rules that can be created by the priority assignment planner. The first is an explicit rule, one which specifies a value for each attribute. Referring to FIG. 1, the explicit rule 110 assigns a priority of "3" to "forecasts" from "customer one" that are due "two or more weeks" after the start of the planning horizon. The second type of rule is a hierarchy rule 112. In an embodiment of the invention, hierarchies are built in order to group attribute values. For example, there could be a hierarchy value called "manufacturing customers." Within manufacturing customers there could be "large enterprises", "medium enterprises", and "small enterprises." Within large enterprises there could be "customer one" and "customer two". Using these hierarchies, a priority assignment planner can create priority assignment rules of varying scope. In the example hierarchy rule 112 in FIG. 1, the customer value "large enterprise" is specified and therefore this rule applies to several customers one of which is "customer one". The third type of assignment rule is the wildcard 114, a rule that contains an attribute value of "*". The sample wildcard assignment rule 114 specifies a priority of "4" for forecasts from all customers that are due two weeks after the start of the planning horizon or later. This wildcard assignment rule can be used by the priority assignment planner to define default priority values. The explicit rules take precedence over the hierarchy rules and the wildcard rules. The hierarchy rules take precedence over the wildcard rules.

The assigner, the second major component of the present invention, is used to actually perform the priority assignment on a given set of demand statements using a specified set of assignment rules. The demand statements file contains, at a minimum, a field for each attribute that is contained in the rule database. The assigner interprets a set of stored assignment rules that have been defined by the ruler, identifies for every demand statement the relevant assignment rules and performs the priority assignment according to those rules. If the set of assignment rules does not cover a specific demand, the priority of that specific demand will not get changed.

In order to handle temporary exceptions, such as assigning a different priority for specific demands compared to the standard set of assignment rules, the ruler and assigner can be used several times in sequence. Exception assignment rules get defined in the ruler and stored as a different set of assignment rules. The assigner will first assign priorities based on the standard set of assignment rules and afterwards reassign based on the exception rules.

FIG. 2 is a block diagram of an exemplary system for performing master planning priority assignment. The system of FIG. 2 includes user systems 202 through which a priority assignment planner will contact a host system 204. In a preferred embodiment, the host system 204 executes a program that performs master planning priority assignment. The user systems 202 are coupled to a host system 204 via a network 206. Each user system 202 may be implemented using a general-purpose computer executing a computer program for carrying out the processes described herein. The user systems 202 may be personal computers or host attached terminals. If the user systems 202 are personal computers, the processing described herein may be shared by user system 202 and host system 204. This processing may be shared by providing an applet to the user system 202 or in any other manner that is known in the art.

Network 206 may be any type of known network including a local area network (LAN), a wide area network (WAN), or a global network (e.g., Internet). The user system 202 may be coupled to the host system 204 through multiple networks (e.g., intranet and Internet) so that not all user systems 202 are coupled to the host system 204 through the same network. One or more of the user systems 202 and the host system 204 may be connected to network 206 in a wireless fashion and network 206 may be a wireless network. In a preferred embodiment, network 206 is an intranet and each user system 202 executes a user interface application (e.g., web browser) to contact the host system 204 through the network 206. Alternatively, a user system 202 may be implemented using a device programmed primarily for accessing network 206 such as WebTV.

The host system 204 may be implemented using a server operating in response to a computer program stored in a storage medium accessible by the server. The host system 204 may operate as a network server (often referred to as a web server) to communicate with the user systems 202. The host system 204 handles sending and receiving information to and from user systems 202 and can perform associated tasks. The host system 204 may also include a firewall to prevent unauthorized access to the host system 204 and enforce any limitations on authorized access. For instance, an administrator may have access to the entire system and have authority to modify portions of the system. The firewall may be implemented using conventional hardware and/or software as is known in the art.

The host system 204 also operates as an applications server. The host system 204 executes one or more computer programs to perform master planning priority assignment. These application programs perform the functions described herein and include the processing of the "ruler" and "assigner" components, and the attribute definition. Processing may be shared by the user system 202 and the host system 204 by providing an application (e.g., java applet) to the user system 202. Alternatively, the user system can include a stand-alone software application for performing a portion of the processing described herein. It is understood that separate servers may be used to implement the network server functions and the applications server functions. Alternatively, the network server, firewall and the applications server can be implemented by a single server executing computer programs to perform the requisite functions.

In an exemplary embodiment of the invention, the rule data is stored as a relational database and the demand data is stored as a sequential file on a storage device 208 connected to the host system 204. The demand and rule data can be stored in a sequential file, an indexed file, a database or any other type of data structure that is known in the art. One or more rule databases will be stored and accessible to priority assignment planners through user systems 202. Similarly one or more demand files will be stored and accessible to priority assignment planners through user systems 202.

Figure 3:
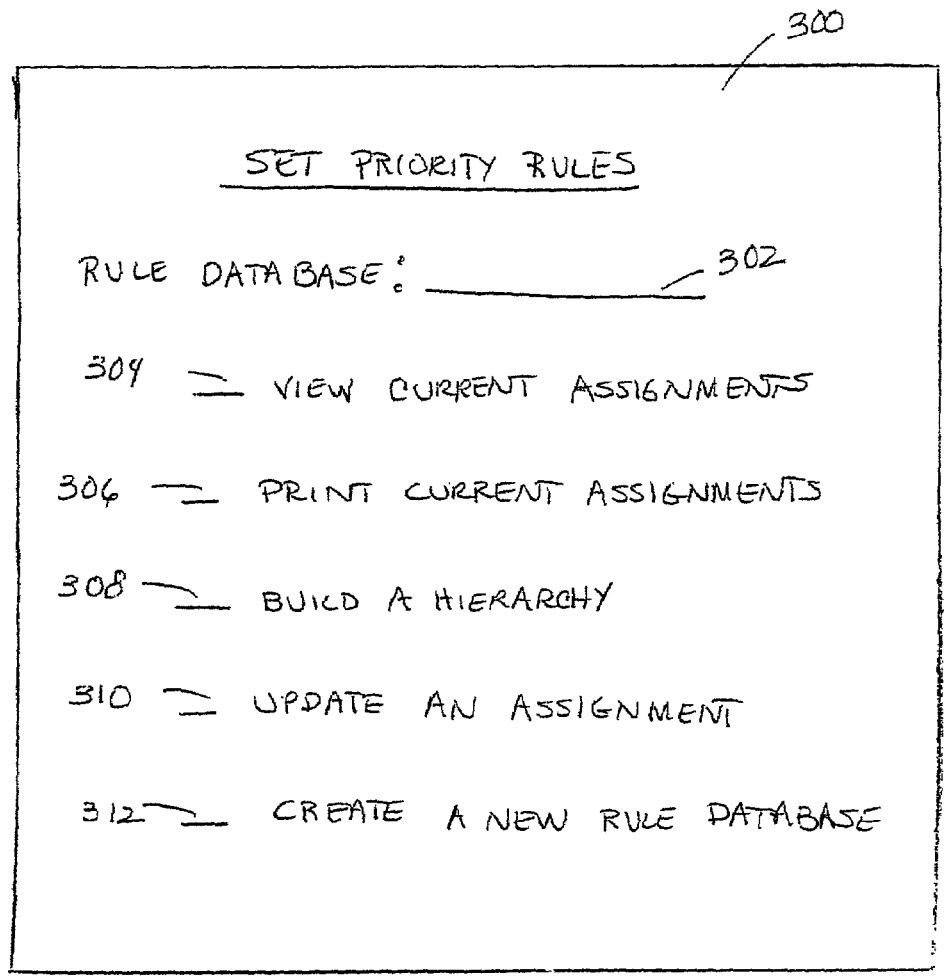
FIG. 3 depicts an exemplary user interface for setting priority rules.

Storage device 208 may be implemented using a variety of devices for storing electronic information such as a file transfer protocol (FTP) server. It is understood that storage device 208 may be implemented using memory contained in a host system 204 or may be a separate physical device connected to host system 204. If the storage device 208 is a separate physical device it may be connected to the host system 204 in any manner known in the art including both direct and network connections. Storage device 208 contains a variety of information including the rule databases, the demand files, and the predefined attributes. Storage device 208 may also contain information concerning the submission of a report request. [0022] Referring to FIG. 3, an exemplary user interface for setting priority rules is shown. The "set priority rules" screen 300 will be presented when a user system 202 contacts the host system 204 to perform set priority rule functions. The host system 204 may require the user system 202 to log in by providing a user name and password as is known in the art. Priority assignment planner actions such as update, viewing and applying priorities can be restricted to particular files using security tools. Once the priority assignment planner is logged in, the screen 300 shown in FIG. 3 is presented. First, the priority assignment planner specifies a particular rule database 302. The user then chooses between options that include: "view the current assignments" 304, "print the current assignments" 306, "build a hierarchy" 308, "update the current assignments" 310, and "create a new rule database" 312. If the planner chooses "view the current assignments" 304, a screen displaying the rule database will be displayed on the screen. FIG. 1 depicts an example of an exemplary rule database layout. Any attributes that impact the priority assignment process can be tracked in the rule database 100 which is set up by a system administrator. If the user chooses "print current assignments" 306 a copy of the rule database will be sent to a printer selected by the user system 202.

Choosing "build a hierarchy" 308 will allow a priority assignment planner to create a hierarchy in order to group attribute values. As described above, level 1 of the hierarchy could be "manufacturing customers" and level 2 within manufacturing customers could contain "large enterprises", "medium enterprises", and "small enterprises." Level 3 within large enterprises there could include "customer one" and "customer two." Any number of levels could be created using the "build a hierarchy" 308 option. In an exemplary embodiment the hierarchy will be stored in a relational database on a storage device 208 connected to the host system 204. This option does not require a rule database 302 to be specified.

The option "update an assignment" 310 will allow a priority assignment planner to change the rule database. The priority assignment planner will be presented with the rule database 302 that was specified. The priority assignment planner can then add, delete and modify assignment rules using explicit, hierarchy or wildcard types of rules. If the priority assignment planner has the proper access authority he will be able to change the priority rules. The last option "create a new rule database" 312 will allow an authorized priority assignment planner to create a new rule database from scratch or by using an existing rule database as a template.

Figure 4:
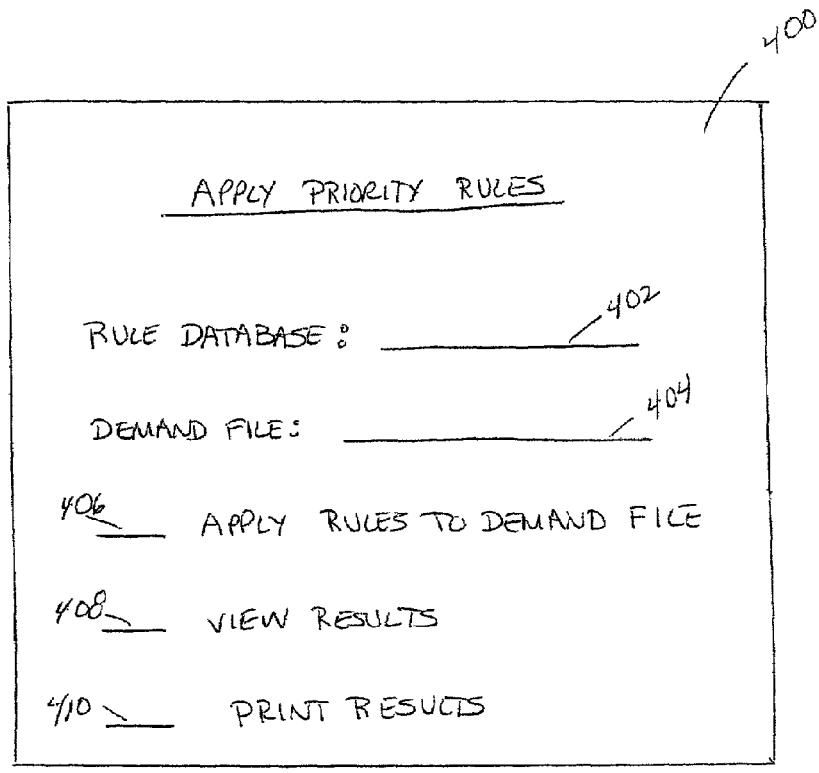
FIG. 4 depicts an exemplary user interface for applying priority rules to a demand file.

Referring to FIG. 4, an exemplary user interface for applying the priority rules 400 is generally shown. The "apply priority rules" screen 400 will be presented when a user system 202 contacts the host system 204 to perform apply priority rule functions. The host system 204 may require the user system 202 to log in by providing a user name and password as is known in the art. Priority assignment planner actions can be restricted to particular files using security tools. Once the priority assignment planner is logged in, the screen 400 shown in FIG. 4 is presented. A priority assignment planner will enter a rule database 402 and a demand file 404 and then start the priority process by selecting "apply rules to demand file" 406. Once this process has been completed the priority assignment planner can "view the results" 408 or "print the results" 410. In both cases the demand file with the updated priority field will be presented to the user either in print or on the screen.

Figure 5:
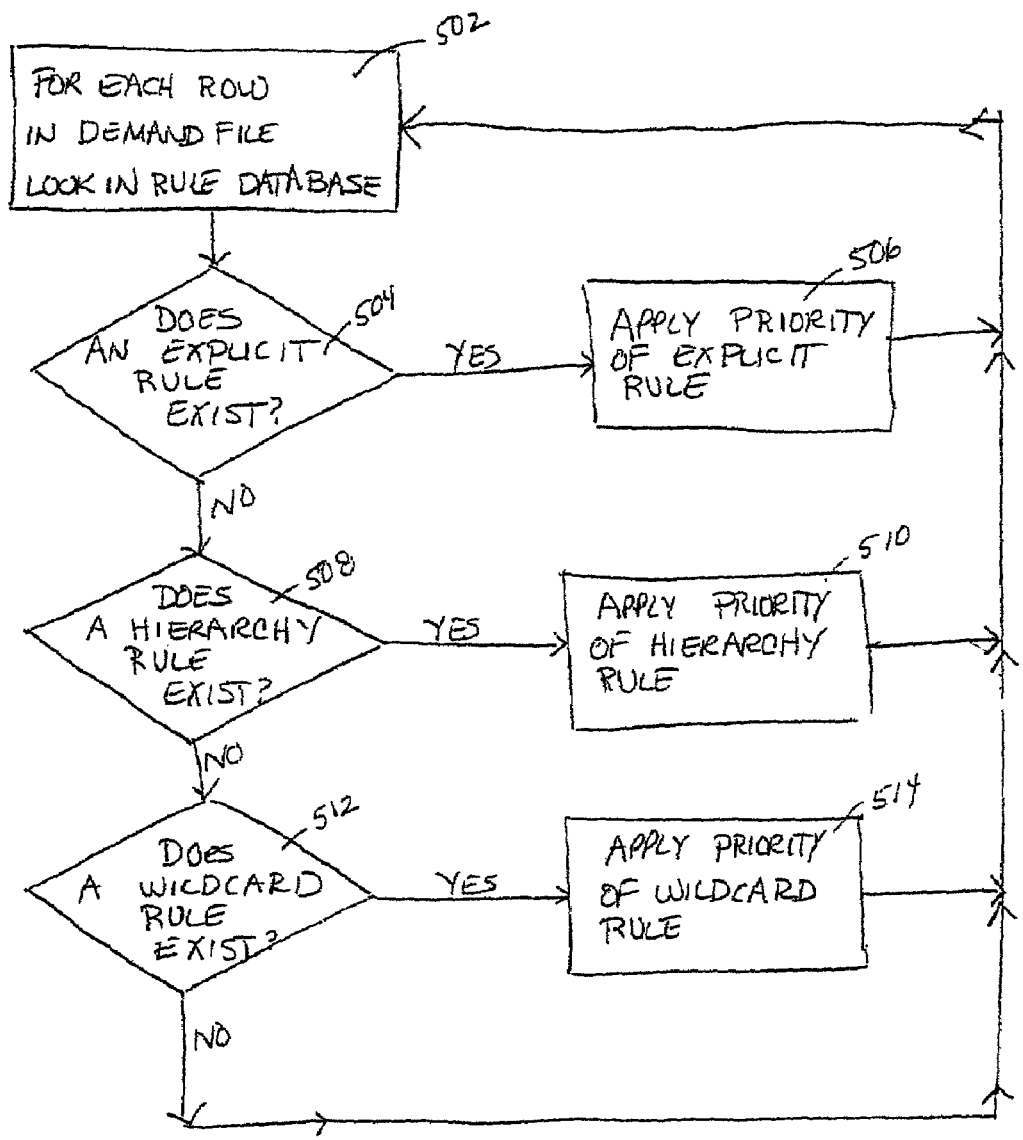
FIG. 5 is a flowchart of an exemplary process for applying priority rules to a demand file.

Referring to FIG. 5, a flowchart of a process for applying the priority rules is generally shown. This process is invoked when the user chooses "apply rules to demand file" 406, referring back to FIG. 4. The process illustrated in FIG. 5 is repeated for every demand file entry as described in step 502. First, a check is made to see if an explicit rule in the rule database applies to the current demand file entry at step 504. If an explicit rule is found, the priority of the explicit rule is assigned to the demand file entry at step 506 and the next demand file entry is retrieved. If no explicit rule is found, the rule database is queried to see if a hierarchy rule applies to the current demand file entry at step 508. If a hierarchy rule is found then the priority associated with the hierarchy rule is assigned to the demand file entry at step 510 and the next demand file entry is retrieved. Next, if no hierarchy or explicit rule applies to the demand file entry, the rule database is searched for a wildcard rule that applies as shown at step 512. If an applicable wildcard rule is found, the priority is assigned at step 514 and the next demand file entry is retrieved. Finally, if no applicable rule is located, the priority of the demand file entry is not updated and the next demand file entry is retrieved. The end result is that an attempt is made to assign a priority to every demand file entry.

The process described in FIG. 5 can be used to perform exception handling. In certain cases an priority assignment planner may require a different priority assignment for a specific set of demands in a demand file. To perform this using the present invention, the priority assignment planner creates a rule database that contains the exception rules. The planner then executes the steps in FIG. 5 using the standard set of assignment rules and the demand file. The output of this first execution is a demand file with standard priorities assigned. Next, the planner executes the steps in FIG. 5 using the exception rules and the demand file with standard priorities assigned. The result will be that the standard priority is assigned to all demand file entries except for those that meet the specifications in the exception rule database.

As described above, the user system 202 and the host system 204 can share the processing. For example, the user system 202 may include a software application that allows the user system to create a report request without assistance from the host system 204. The user system 202 would then contact the host system 204 to generate the report. Alternatively, the host system 204 may provide an application to the user system 202 (e.g., an applet) once the user system 202 contacts the host system 204. Accordingly, processing can be shared by the two systems.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer (such as host system 204) or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The present invention provides improvements over the current state of the art in master planning priority assignment. The present invention provides productivity savings to priority assignment planners by allowing them to define general business priority rules that can be applied to a list of customer demands. In addition, the present invention allows exception handling to be applied in this same manner and avoids the necessity of applying each exception individually and outside of the standard priority assignment system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A computer-implemented method for performing master planning priority assignment, the method comprising:
   creating at least one rule database that includes fields for specifying attributes relating to customer demand files and related priorities;
   assigning a priority to a demand record, said demand record containing a demand record attribute field and a demand record priority field; said assigning including:
      selecting said at least one rule database, said at least one rule database including at least one record, a rule database attribute field that correlates to said demand record attribute field, and a rule database priority field;
      querying said at least one rule database for a corresponding rule database record that contains data in said rule database attribute field that matches data in said demand record attribute field, said matching comprising:
         querying said at least one rule database for an explicit data match;
         if no said explicit data match exists, querying said at least one rule database for a hierarchy value match; and;
         if no said explicit data match or said hierarchy value data match exists, querying said at least one rule database for a wildcard match; and
      based upon said querying, updating data in said demand record priority field with data from said corresponding rule database priority field.

2. The method of claim 1 wherein said data in said corresponding rule database attribute field contains an explicit value operable for specifying a priority to be given to a demand record;
   wherein said match occurs if said data in said demand record attribute field is contained within said explicit value.

3. The method of claim 1 wherein said data in said corresponding rule database attribute field contains a hierarchy value operable for specifying a priority to be given to a hierarchy level defined with said rule database attribute field;
   wherein said match occurs if said data in said demand record attribute field is contained within said hierarchy value.

4. The method of claim 3 further comprising creating said hierarchy value, said hierarchy value containing a hierarchy level.

5. The method of claim 3 further comprising creating said hierarchy value, said hierarchy value containing said explicit value.

6. The method of claim 1 wherein said data in said corresponding rule database attribute field contains a wildcard value operable for specifying a default priority value to said rule database attribute field;
   wherein said data in said demand record attribute field is not used in said matching.

7. The method of claim 1 wherein said demand record attribute field includes due date, customer, and demand type.

8. The method of claim 1 further comprising updating said at least one record in said at least one rule database.

9. A computer-implemented method for master planning priority assignment, the method comprising:
   creating at least one rule database;
   assigning a priority to a demand record, said demand record containing a demand record attribute field and a demand record priority field, the demand record attribute field includes at least one of a due date, customer, and demand type, said assigning including:
      selecting said at least one rule database, said at least one rule database including at least one record, a rule database attribute field that correlates to said demand record attribute field, and a rule database priority field;
      querying said at least one rule database for a corresponding rule database record that contains data in said rule database attribute field that matches data in said demand record attribute field, said matching comprising:
         querying said at least one rule database for an explicit data match;
         if no said explicit data match exists, querying said at least one rule database for a hierarchy value match; and;
         if no said explicit data match or said hierarchy value data match exists, querying said at least one rule database for a wildcard match; and
      based upon said querying, updating data in said demand record priority field with data from said corresponding rule database priority field.

10. A system for performing master planning priority assignment, the system comprising:
    a storage device storing master planning priority assignment data;
    a user system; and
    a host system in communication with said storage device and said user system, said host system implementing a process comprising:
       creating at least one rule database;
       assigning a priority to a demand record, said demand record containing a demand record attribute field and a demand record priority field; said assigning including:
          selecting said at least one rule database, said at least one rule database including at least one record, a rule database attribute field that correlates to said demand record attribute field, and a rule database priority field;
          querying said at least one rule database for a corresponding rule database record that contains data in said rule database attribute field that matches data in said demand record attribute field, said matching comprising:
             querying said at least one rule database for an explicit data match;
             if no said explicit data match exists, querying said at least one rule database for a hierarchy value match; and
             if no said explicit data match or said hierarchy value data match exists, querying said at least one rule database for a wildcard match; and
          based upon said querying, updating data in said demand record priority field with data from said corresponding rule database priority field.

11. The system of claim 10 wherein said wherein said data in said corresponding rule database attribute field contains an explicit value operable for specifying a priority to be given to a demand record;
    wherein said match occurs if said data in said demand record attribute field is contained within said explicit value.

12. The system of claim 10 wherein said data in said corresponding rule database attribute field contains a hierarchy value operable for specifying a priority to be given to a hierarchy level defined within said rule database attribute field;

wherein said match occurs if said data in said demand record attribute field is contained within said hierarchy value.

13. The system of claim 12 wherein said host system implementing a process further comprises creating said hierarchy value, said hierarchy value containing a hierarchy level.

14. The system of claim 12 wherein said host system implementing a process further comprises creating said hierarchy value, said hierarchy value containing said explicit value.

15. The system of claim 10 wherein said data in said corresponding rule database attribute field contains a wildcard value operable for specifying a default priority value to said rule database attribute field;

wherein said data in said demand record attribute field is not used in said matching.

16. The system of claim 10 wherein said demand record attribute field includes due date, customer, and demand type.

17. The system of claim 10 wherein said host system implementing a process further comprises updating said at least one record in said at least one rule database.

18. The system of claim 10 further comprising a network providing communication between the host system and the user system.

19. The system of claim 10 further comprising a network providing communication between the storage device and the host system.

20. A system for performing master planning priority assignment, the system comprising:

at least one rule database that includes fields for specifying attributes relating to customer demand files and related priorities;

a storage device storing master planning priority assignment data associated with said at least one rule database;

a user system; and a host system in communication with said storage device and said user system, said host system implementing a process comprising:

creating said at least one rule database;

assigning a priority to a demand record, said demand record containing a demand record attribute field and a demand record priority field, the demand record attribute field includes at least one of a due date, customer, and demand type, said assigning including:

selecting said at least one rule database, said at least one rule database including at least one record, a rule database attribute field that correlates to said demand record attribute field, and a rule database priority field;

querying said at least one rule database for a corresponding rule database record that contains data in said rule database attribute field that matches data in said demand record attribute field, said matching comprising:

querying said at least one rule database for an explicit data match;

if no said explicit data match exists, querying said at least one rule database for a hierarchy value match; and if no said explicit data match or said hierarchy value data match exists, querying said at least one rule database for a wildcard match; and based upon said querying, updating data in said demand record priority field with data from said corresponding rule database priority field.

21. A storage medium encoded with machine-readable computer program code for performing master planning priority assignment, the storage medium storing instructions for causing a host system to implement a method comprising:

creating at least one rule database that includes fields for specifying attributes relating to customer demand files and related priorities;

assigning a priority to a demand record, said demand record containing a demand record attribute field and a demand record priority field; said assigning including:

selecting said at least one rule database, said at least one rule database including at least one record, a rule database attribute field that correlates to said demand record attribute field, and a rule database priority field;

querying said at least one rule database for a corresponding rule database record that contains data in said rule database attribute field that matches data in said demand record attribute field, said matching comprising:

querying said at least one rule database for an explicit data match;

if no said explicit data match exists, querying said at least one rule database for a hierarchy value match; and if no said explicit data match or said hierarchy value data match exists, querying said at least one rule database for a wildcard match; and based upon said querying, updating data in said demand record priority field with data from said corresponding rule database priority field.

22. The storage medium of claim 21 wherein said data in said corresponding rule database attribute field contains an explicit value operable for specifying a priority to be given to a demand record;

wherein said match occurs if said data in said demand record attribute field is contained within said explicit value.

23. The storage medium of claim 21 wherein said data in said corresponding rule database attribute field contains a hierarchy value operable for specifying a priority to be given to a hierarchy level defined within said rule database attribute field;

wherein said match occurs if said data in said demand record attribute field is contained within said hierarchy value.

24. The storage medium of claim 23 further comprising creating said hierarchy value, said hierarchy value containing a hierarchy level.

25. The storage medium of claim 23 further comprising creating said hierarchy value, said hierarchy value containing an explicit value.

26. The storage medium of claim 21 wherein said data in said corresponding rule database attribute field contains a wildcard value operable for specifying a default priority value to said rule database attribute field;

wherein said data in said demand record attribute field is not used in said matching.

27. The storage medium of claim 21 wherein said demand record attribute field includes due date, customer, and demand type.

28. The storage medium of claim 21 further comprising updating said at least one record in said at least one rule database.

29. A storage medium encoded with machine-readable computer program code for performing master planning priority assignment, the storage medium storing instructions for causing a host system to implement a method comprising:

creating at least one rule database;

assigning a priority to a demand record, said demand record containing a demand record attribute field and a demand record priority field, the demand record attribute field includes at least one of a due date, customer, and demand type, said assigning including:

selecting said at least one rule database, said at least one rule database including at least one record, a rule database attribute field that correlates to said demand record attribute field, and a rule database priority field;

querying said at least one rule database for a corresponding rule database record that contains data in said rule database attribute field that matches data in said demand record attribute field, said matching comprising:

querying said at least one rule database for an explicit data match;

if no said explicit data match exists, querying said at least one rule database for a hierarchy value match; and;

if no said explicit data match or said hierarchy value data match exists, querying said at least one rule database for a wildcard match; and based upon said querying, updating data in said demand record priority field with data from said corresponding rule database priority field.

* * * * *